US012493929B2

(12) United States Patent
Yoshida et al.

(10) Patent No.: US 12,493,929 B2
(45) Date of Patent: Dec. 9, 2025

(54) IMAGE PROCESSING APPARATUS, IMAGE PROCESSING METHOD, AND PROGRAM

(71) Applicant: Sony Group Corporation, Tokyo (JP)

(72) Inventors: Keisuke Yoshida, Kanagawa (JP); Yuko Shibaike, Saitama (JP)

(73) Assignee: Sony Group Corporation, Tokyo (JP)

( * ) Notice: Subject to any disclaimer, the term of this patent is extended or adjusted under 35 U.S.C. 154(b) by 75 days.

(21) Appl. No.: 18/263,479

(22) PCT Filed: Aug. 5, 2021

(86) PCT No.: PCT/JP2021/029167
§ 371 (c)(1),
(2) Date: Jul. 28, 2023

(87) PCT Pub. No.: WO2022/195909
PCT Pub. Date: Sep. 22, 2022

(65) Prior Publication Data
US 2024/0087093 A1 Mar. 14, 2024

(30) Foreign Application Priority Data

Mar. 15, 2021 (JP) ................. 2021-041617

(51) Int. Cl.
G06T 5/50 (2006.01)
G06T 7/90 (2017.01)
G06T 11/00 (2006.01)
G06V 10/60 (2022.01)

(52) U.S. Cl.
CPC .............. G06T 5/50 (2013.01); G06T 7/90 (2017.01); G06T 11/00 (2013.01); G06V 10/60 (2022.01); G06T 2207/10024 (2013.01); G06T 2207/20221 (2013.01)

(58) Field of Classification Search
CPC ... G06T 5/50; G06T 7/90; G06T 11/00; G06T 2207/10024; G06T 2207/20221; G06V 10/60
See application file for complete search history.

(56) References Cited

U.S. PATENT DOCUMENTS

| 2007/0076100 A1* | 4/2007 | Muraki | H04N 23/673 348/E5.045 |
| 2008/0297613 A1* | 12/2008 | Takahashi | H04N 23/667 348/221.1 |
| 2011/0317028 A1* | 12/2011 | Shinmei | H04N 23/88 348/226.1 |

FOREIGN PATENT DOCUMENTS

| JP | 2005204185 A | 7/2005 |
| JP | 2006345317 A | 12/2006 |
| JP | 2007097033 A | 4/2007 |
| JP | 2008301286 A | 12/2008 |

(Continued)

OTHER PUBLICATIONS

International Search Report (PCT/ISA/210), International Application No. PCT/JP2021/029167, dated Oct. 26, 2021.

Primary Examiner — Xin Sheng
(74) Attorney, Agent, or Firm — Michael Best & Friedrich LLP

(57) ABSTRACT

To make it possible to synthesize multiple pieces of image data at a step when the multiple pieces of image data are RAW images on which a development process has not been implemented. An image processing apparatus includes a synthesis processing section that synthesizes multiple pieces of RAW image data, each of which constitutes an image of one frame, to generate synthesized RAW image data.

17 Claims, 11 Drawing Sheets

(56) References Cited

FOREIGN PATENT DOCUMENTS

| | | |
|---|---|---|
| JP | 2009232382 A | 10/2009 |
| JP | 2012010105 A | 1/2012 |
| JP | 2020141346 A | 9/2020 |

* cited by examiner

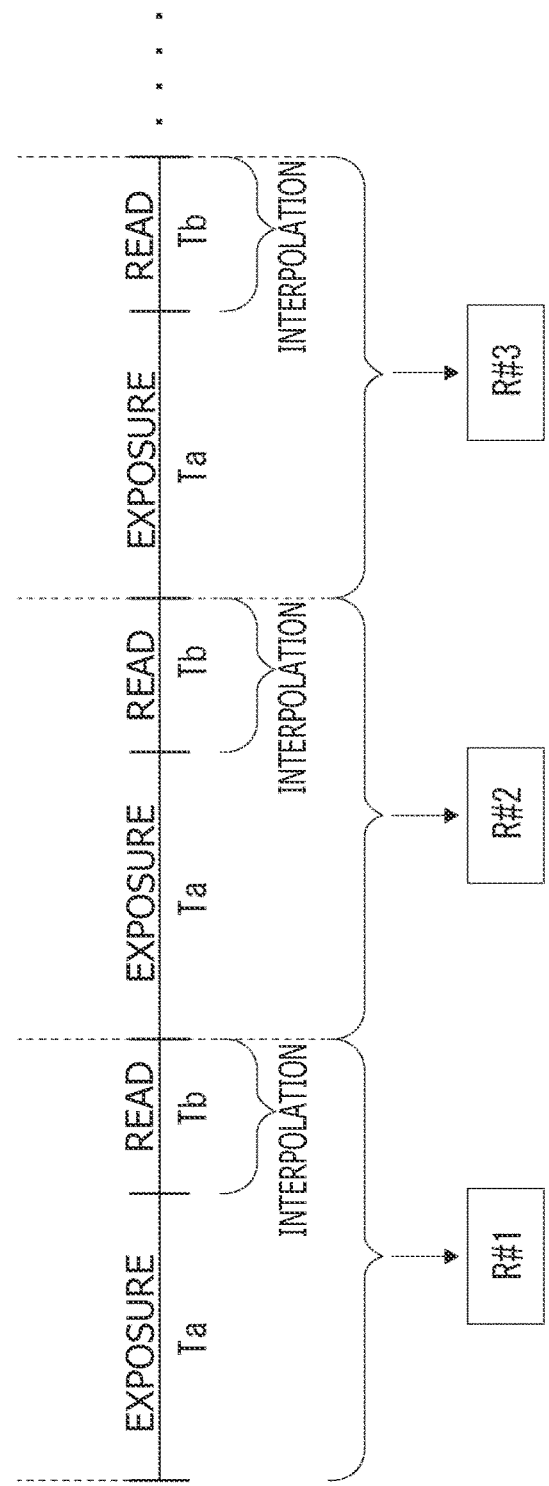

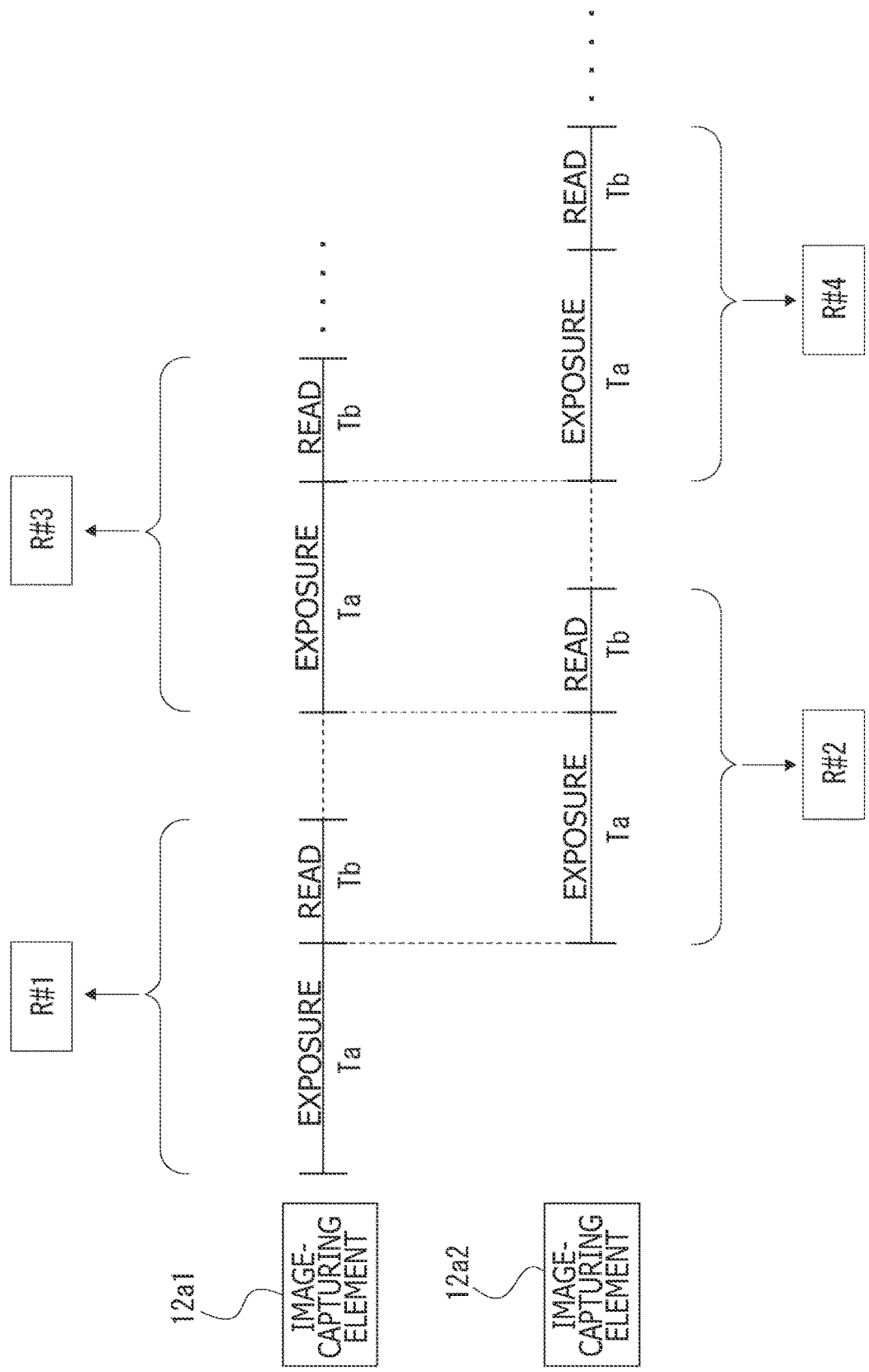

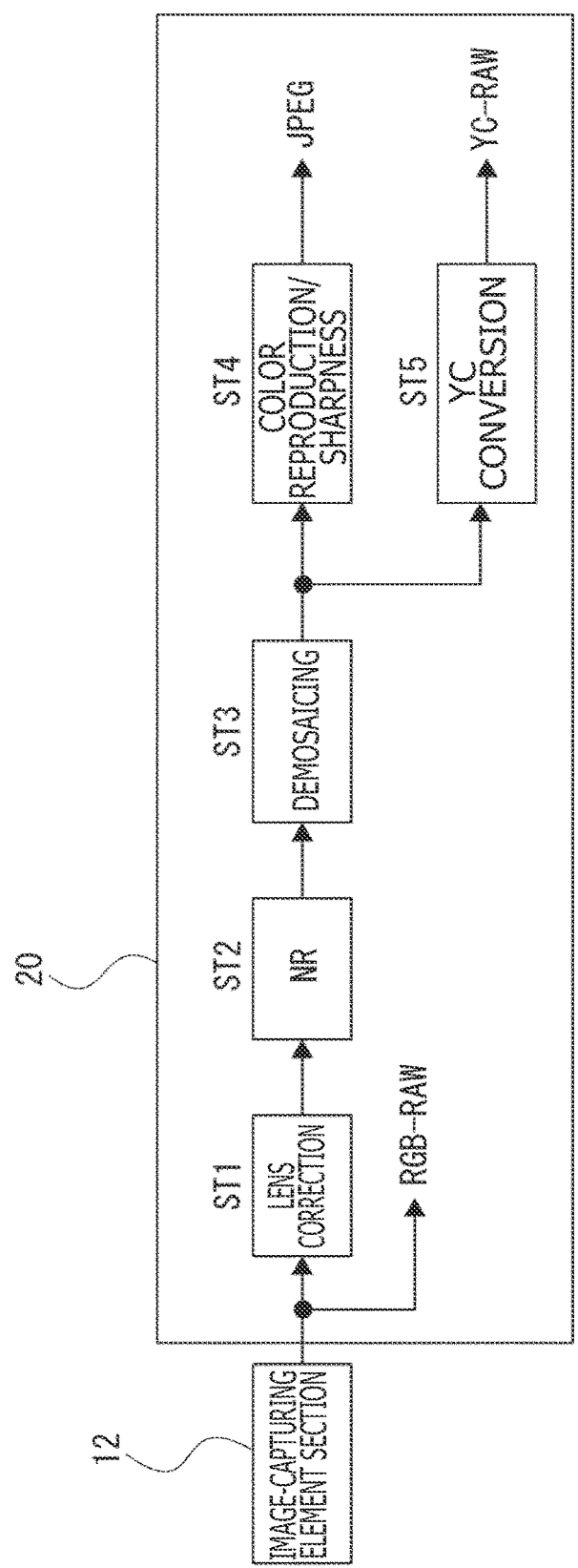

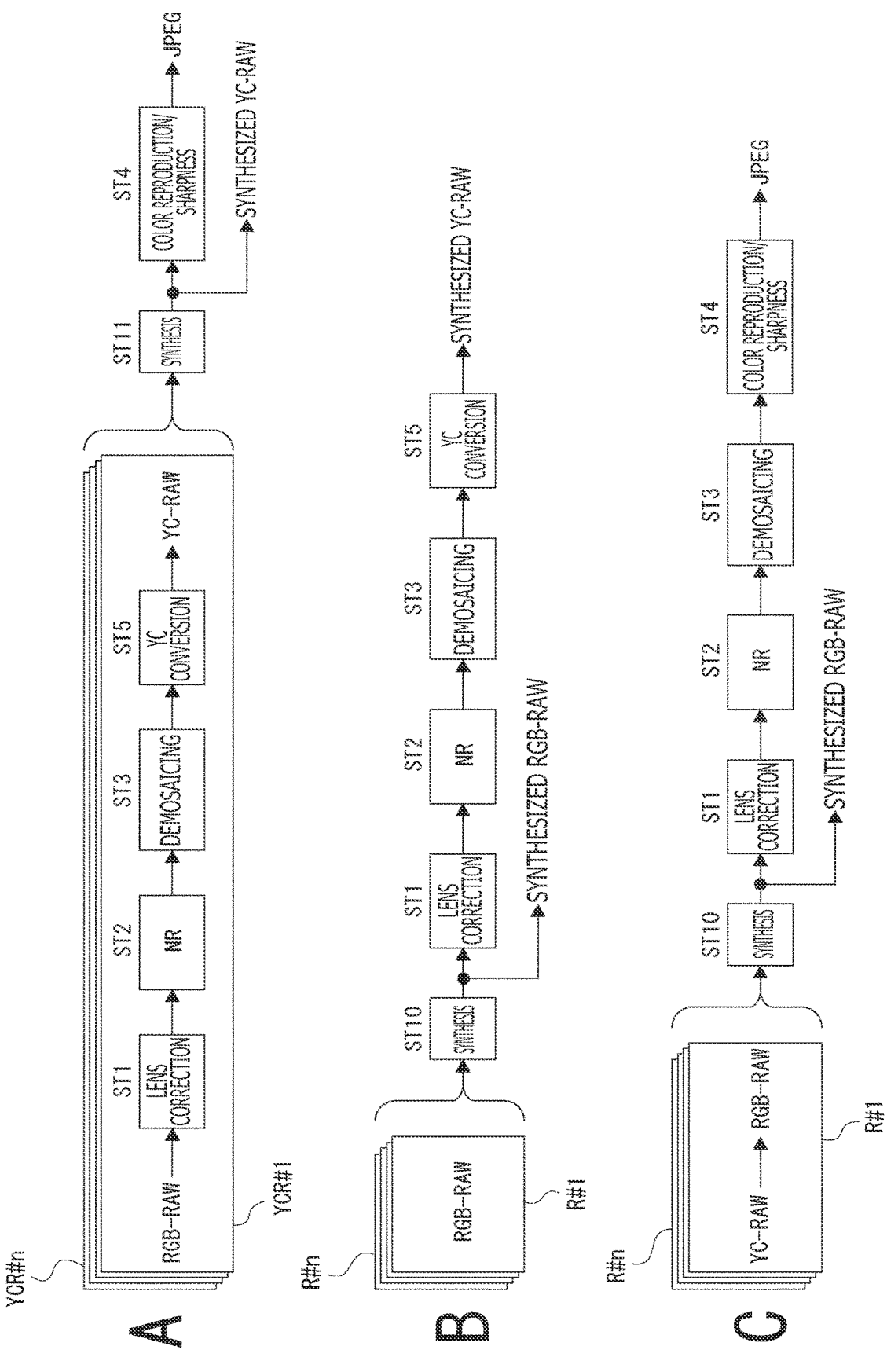

IMAGE PROCESSING APPARATUS, IMAGE PROCESSING METHOD, AND PROGRAM

TECHNICAL FIELD

The present technology relates to an image processing apparatus, an image processing method, and a program, and relates to an image synthesis process technology.

BACKGROUND ART

Images on which image enhancement has not been performed in an image-capturing apparatus or the like are called RAW images in some cases. Recording of RAW images as image-capturing-result images is performed typically. This is because recording of RAW images has a merit of enhancement of the degree of freedom in a process such as color reproduction after image-capturing.

PTL 1 described below discloses a technology that makes it possible to easily realize image effects such as front curtain synchronization/rear curtain synchronization/multi light emission using long exposure, without requiring proficiency.

CITATION LIST

Patent Literature

[PTL 1]
  JP 2009-232382A

SUMMARY

Technical Problem

Meanwhile, typically, photographers set shutter speeds when they perform image-capturing with an image-capturing apparatus. There are also image-capturing apparatuses that set shutter speeds automatically. In either case, a shutter speed has been set at a time when image-capturing is executed.

Accordingly, even if RAW image data has been recorded, shutter speeds cannot be adjusted after image-capturing. Because of this, image-capturing can fail in some cases because a shutter-speed setting before the image-capturing has not been appropriate or for other reasons.

In addition, image data in a predetermined format is generated from RAW image data by image enhancement by performing a development process, but in a case where image data is synthesized after development as in PTL 1, it is not always the case that a development process suited for synthesized images is necessarily performed.

The present disclosure has been made by paying attention to these points, and an object thereof is to propose a technology that uses RAW images effectively.

Solution to Problem

An image processing apparatus according to the present technology includes a synthesis processing section that synthesizes multiple pieces of RAW image data, each of which constitutes an image of one frame, to generate synthesized RAW image data.

A set of RAW image data obtained by image-capturing is synthesized. That is, they are synthesized at a step before a development process.

It is conceivable that the image processing apparatus according to the present technology described above further includes a development processing section that performs a development process on the synthesized RAW image data generated by the synthesis processing section, to generate image data in a predetermined format.

That is, after RAW image data is synthesized, a development process is performed on a synthesized RAW image data thereof.

It is conceivable that, in the image processing apparatus according to the present technology described above, the synthesis processing section generates, by a synthesis process, synthesized RAW image data equivalent to an image captured at a shutter speed slower than a shutter speed at a time of image-capturing.

By synthesizing multiple pieces of RAW image data, it is made possible to obtain an image of a shutter speed with an exposure period longer than the exposure period of a shutter speed at a time of imaging-capturing of the individual RAW images.

It is conceivable that, in the image processing apparatus according to the present technology described above, the multiple pieces of RAW image data synthesized by the synthesis processing section are RAW image data of multiple temporally consecutive frames.

For example, RAW image data of multiple frames obtained by temporally consecutive image-capturing that are obtained by consecutive image-capturing or video image-capturing is treated as a synthesis subject.

It is conceivable that, in the image processing apparatus according to the present technology described above, the multiple pieces of RAW image data synthesized by the synthesis processing section are RAW image data of multiple temporally consecutive frames captured at a constant shutter speed.

For example, PAW image data of multiple frames obtained by temporally consecutive image-capturing that are obtained by consecutive image-capturing or video image-capturing at a constant shutter speed is treated as a synthesis subject.

It is conceivable that, in the image processing apparatus according to the present technology described above, the multiple pieces of RAW image data synthesized by the synthesis processing section are multiple pieces of RAW image data that are temporally adjacent to each other, and have exposure periods that are made temporally mutually consecutive.

For example, temporally consecutive RAW image data is a series of RAW image data without non-exposure periods.

It is conceivable that, in the image processing apparatus according to the present technology described above, the multiple pieces of RAW image data synthesized by the synthesis processing section have exposure periods that are made temporally consecutive by performing an addition process of adding an exposure amount equivalent to non-exposure periods of an image-capturing element relative to an exposure amount in exposure periods of the image-capturing element.

Since, for example, there are exposure periods and read periods in a time division manner in image-capturing operation by an image-capturing element (image sensor), the read periods are non-exposure periods over which exposure has been interrupted. Interpolation equivalent to an exposure amount (amount of electric charge accumulated due to exposure) is performed in such non-exposure periods.

It is conceivable that, in the image processing apparatus according to the present technology described above, the multiple pieces of RAW image data synthesized by the synthesis processing section have exposure periods that are made temporally consecutive by causing multiple image-capturing elements to sequentially read out the multiple pieces of RAW image data alternately.

By using multiple image-capturing elements, it is possible to perform exposure with one image-capturing element in a read period of another image-capturing element.

It is conceivable that, in the image processing apparatus according to the present technology described above, the synthesis processing section selects synthesis-subject RAW image data to be treated as a subject of a synthesis process from multiple pieces of temporally consecutive PAW image data, on the basis of specification of a shutter speed.

For example, it is made possible for a user to specify a shutter speed when a synthesis process is performed.

It is conceivable that, in the image processing apparatus according to the present technology described above, the synthesis processing section selects synthesis-subject RAW image data to be treated as a subject of a synthesis process from multiple pieces of temporally consecutive RAW image data, on the basis of specification of the number of images.

For example, it is made possible for a user to specify the number of images when a synthesis process is performed.

It is conceivable that, in the image processing apparatus according to the present technology described above, the RAW image data is image data having a color array that is the same as a color array of an image-capturing element.

It is conceivable that, in the image processing apparatus according to the present technology described above, the PAW image data is image data in which pixel values read out from an image-capturing element are in a luminance-value/chroma-value format, and has not been subjected to color reproduction/sharpness processing.

The image data is generally called YC-RAW image data.

An image processing method according to the present technology is an image processing method in which an image processing apparatus executes a synthesis process of synthesizing multiple pieces of RAW image data, each of which constitutes an image of one frame, to generate synthesized RAW image data. Thereby, RAW image data is used effectively.

A program according to the present technology is a program for causing an information processing apparatus to execute the image processing. Thereby, it is made possible to realize the image processing apparatus described above easily.

BRIEF DESCRIPTION OF DRAWINGS

FIG. 8 is an explanatory diagram of an addition process of making exposure periods consecutive according to the embodiment.

FIG. 9 is an explanatory diagram of imaging-capturing of RAW image data whose exposure periods are consecutive according to the embodiment.

FIG. 10 is an explanatory diagram of YC-RAW image data and a development process.

FIG. 11 is an explanatory diagram of synthesis processes and development processes according to the embodiment.

DESCRIPTION OF EMBODIMENT

Figure 1:
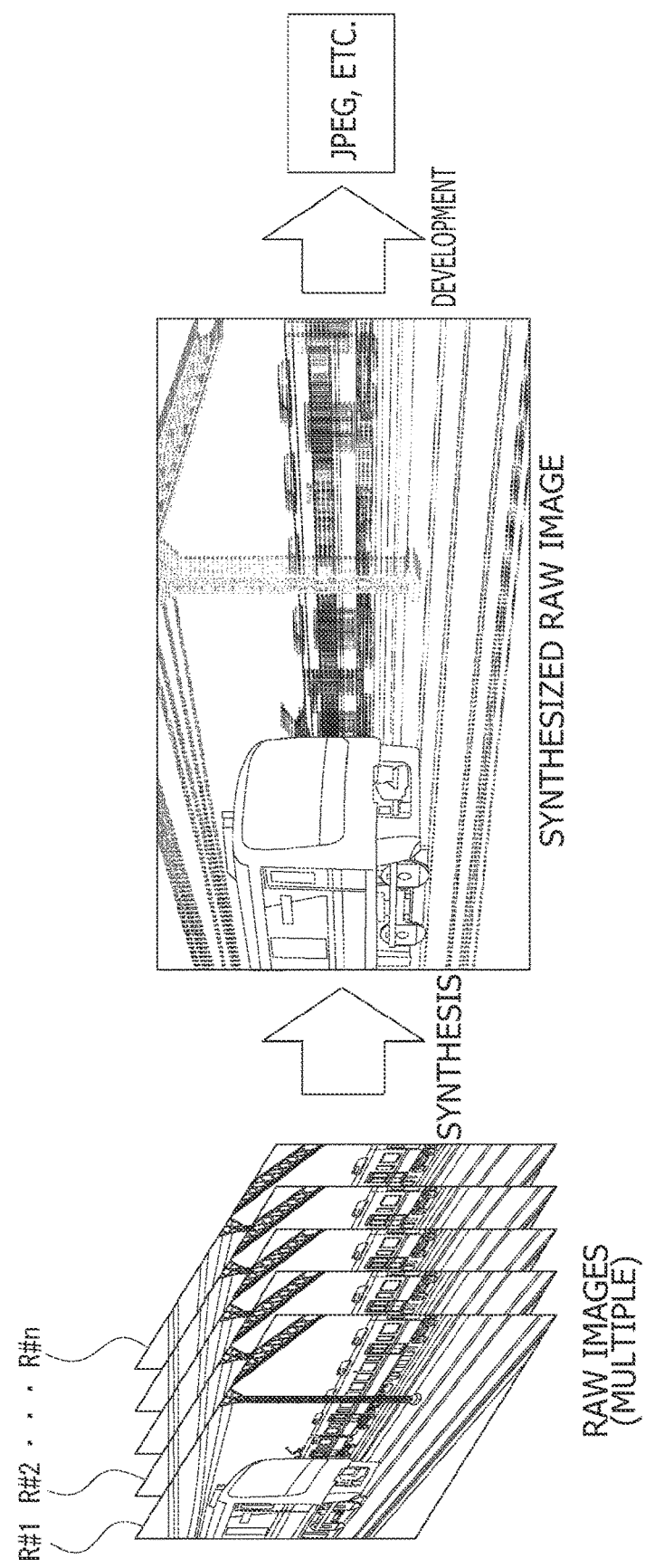
FIG. 1 is an explanatory diagram of a synthesis process according to an embodiment of the present technology.

Hereinbelow, an embodiment is explained in the following order.
<1. Overview>
<2. Configuration of Image-Capturing Apparatus>
<3. Configuration of Information Processing Apparatus>
<4. RAW Image Data Synthesis Process and Development Process>
<5. YC-RAW Image Data Synthesis Process and Development Process>
<6. Summary and Modification Examples>

Note that images on which a part or the whole of a development process has not been performed at an image-capturing apparatus or the like are called RAW images in the present disclosure. In addition, image data included in one image (an image of one frame) as a RAW image is called RAW image data.

Specifically, there are various types of image data called RAW image data, and image data having a color array which is the same as the color array of an image-capturing element (image sensor) is used as an example of RAW image data in the present embodiment. Note that image data that has resulted in having a color array which is the same as the color array of an image-capturing element due to the same defect correction also is included in the RAW image data.

For example, in a case where an image sensor outputs pixel signals of R (red), G (green), and B (blue), the RAW image data has image data in an RGB format. Note that examples of the RAW image data also include image data including not only R, G, and B pixel values, but also W (white) pixel values. Furthermore, in a case of a Bayer-array image sensor, the RAW image data is image data including pixel values of each of G1 (green 1), G2 (green 2), R (red), and B (blue). In addition, there is also an image data format in which pixel values of each of G1, G2, R, and B are put together in one of four separate channels. For example, one frame is configured only with any one of G1, G2, R, and B, and thereafter is compressed into image data of one channel. That is, the image data is G1 image data, G2 image data, R image data, B image data, or the like. This type of image data also is included in examples of the RAW image data.

In addition, image data that is obtained by converting image data read out from an image-capturing element to a luminance-value/chroma-value format, and has not been subjected to color reproduction/sharpness processing also is called RAW image data in some cases. This type of image data also is a type of the RAW image data in the present disclosure and is called "YC-RAW image data" in order to make a distinction in explanation.

1. Overview

It is conceivable that an image processing apparatus according to the embodiment is mounted as an image processing section on an image-capturing apparatus (camera) or an information processing apparatus that performs image editing or the like. In addition, the image-capturing apparatus or the information processing apparatus itself on which the image processing section is mounted can also be regarded as the image processing apparatus.

Such an image processing apparatus performs a process of synthesizing multiple pieces of RAW image data to generate synthesized RAW image data.

FIG. 1 schematically depicts synthesis of multiple pieces of RAW image data, RAW image data R #1 to RAW image data R #n, to generate data of one synthesized RAW image. Conceivable examples of a synthesis process in the present embodiment include a synthesis process in which multiple pieces of image data are superimposed one on another at such positions that their frames are aligned, and a synthesis process in which multiple pieces of image data are superimposed one on another at such positions that positions of a particular imaging subject are aligned.

In one conceivable example in this case, the multiple pieces of RAW image data (R #1 to R #n) which are subjects of the synthesis process are a set of RAW image data that is captured consecutively, and has a relation as temporally consecutive frames.

It should be noted that it is conceivable also that multiple pieces of PAW image data that are completely unrelated temporally are synthesized. Furthermore, it is conceivable also that multiple pieces of RAW image data which are images not particularly correlated as imaging subjects are synthesized.

In addition, data of one synthesized RAW image may be generated from the multiple pieces of RAW image data, or multiple pieces of synthesized RAW image data which are fewer than the multiple pieces of RAW image data may be generated from the multiple pieces of RAW image data.

For example, supposing that there are ten pieces of temporally consecutive RAW image data, conceivable examples include also selective use of PAW image data to be synthesized, such as use of all the ten pieces of RAW image data for synthesis or use of seven pieces of RAW image data for synthesis.

In addition, a development process is performed on the synthesized RAW image data. For example, it is made possible thereby to obtain image data in a predetermined format such as JPEG (Joint Photographic Experts Group) image data. Certainly, examples of the image data in the predetermined format are not limited to image data in a JPEG format. For example, it may be image data in HEIF (High Efficiency Image File Format), YUV422, YUV420, or the like.

In the following explanation of the embodiment, mainly, an example in which multiple pieces of temporally consecutive RAW image data are synthesized to generate synthesized RAW image data is mentioned.

For example, data of multiple consecutively recorded PAW images is synthesized to generate data of one synthesized RAW image. Thereby, an effect equivalent to a long exposure effect is attained. In addition, it is made possible to create synthesized RAW image data at any shutter speed slower than a shutter speed at a time of imaging-capturing of each piece of PAW image data by setting the number of pieces of RAW image data to be synthesized.

In addition, similarly to typical development processes, lens correction, NR (noise reduction), demosaicing, color reproduction, sharpness processing, and the like are applied to the synthesized RAW image data obtained by the synthesis process.

2. Configuration of Image-Capturing Apparatus

Figure 2:
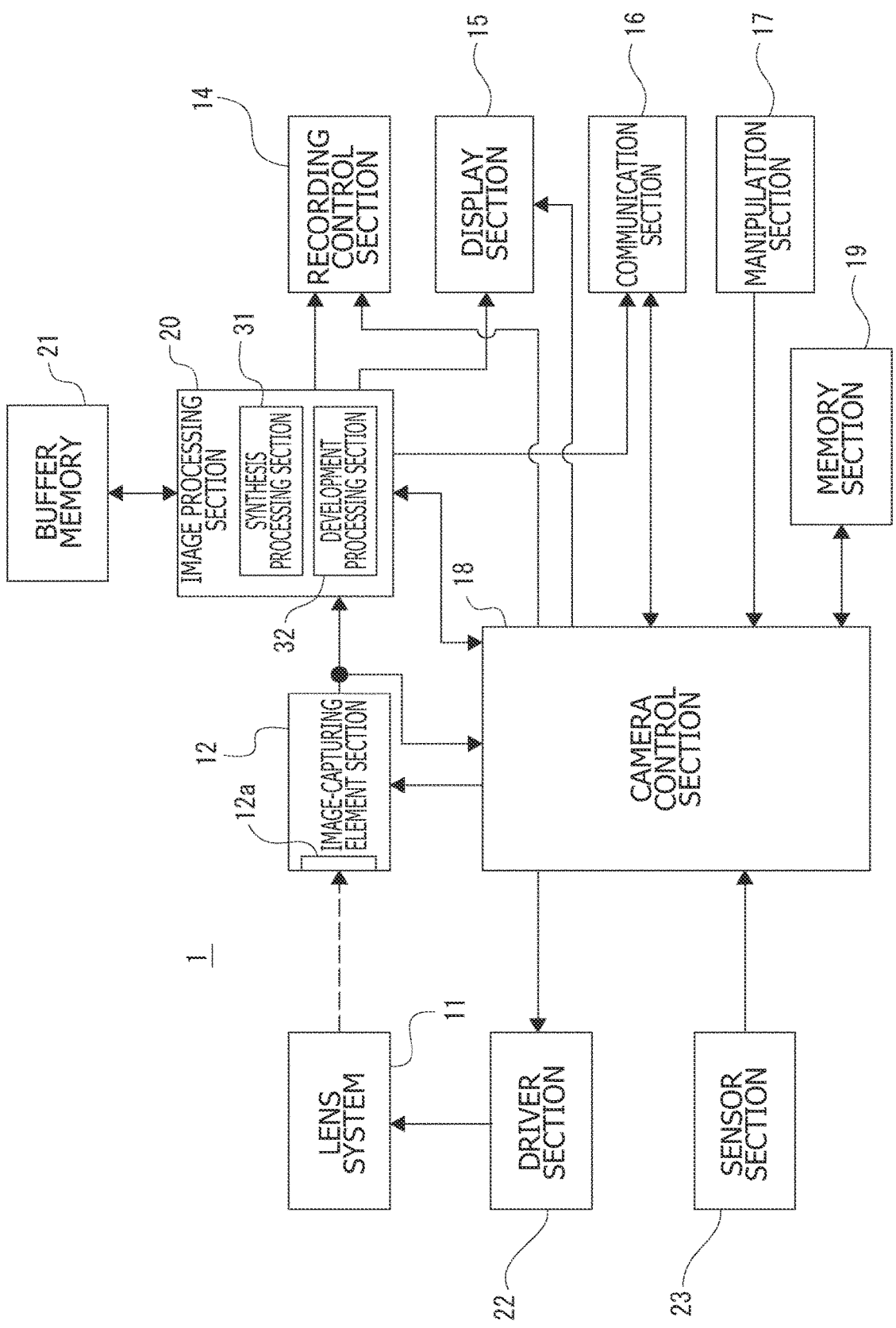
FIG. 2 is a block diagram of an image-capturing apparatus according to the embodiment.

With reference to FIG. 2, a configuration example of an image-capturing apparatus 1 is explained.

The image-capturing apparatus 1 includes an image processing section 20 that performs a RAW image data synthesis process, and the image processing section 20 or the image-capturing apparatus 1 including the image processing section 20 can be regarded as an example of the image processing apparatus according to the present disclosure.

For example, the image-capturing apparatus 1 has a lens system 11, an image-capturing element section 12, a recording control section 14, a display section 15, a communication section 16, a manipulation section 17, a camera control section 18, a memory section 19, the image processing section 20, a buffer memory 21, a driver section 22, and a sensor section 23.

The lens system 11 includes lens such as a zoom lens or a focus lens and aperture mechanisms, and the like. The lens system 11 guides light (incident light) from an imaging subject, and makes the light focused on the image-capturing element section 12.

For example, the image-capturing element section 12 has an image sensor 12a (image-capturing element) such as a CMOS (Complementary Metal Oxide Semiconductor) type image sensor or a CCD (Charge Coupled Device) type image sensor.

In the image-capturing element section 12, for example, a CDS (Correlated Double Sampling) process, an AGC (Automatic Gain Control) process, or the like is executed on an electric signal obtained by photoelectric conversion of light received by the image sensor 12a, and furthermore an A/D (Analog/Digital) conversion process is performed on the electric signal. Then, an image-capturing signal as digital data is output to the image processing section 20 or the camera control section 18 on the downstream side.

For example, the image processing section 20 is configured as an image processing processor by using a DSP (Digital Signal Processor) or the like.

The image processing section 20 implements various types of signal processing on a digital signal (captured-image signal) from the image-capturing element section 12, that is, RAW image data.

Note that, for example, like YC-RAW image data mentioned above, RAW image data means image data obtained by implementing some processes on a digital signal from the image-capturing element section 12, in some cases. In addition, image data that has not been processed as far as to have a format of YC-RAW image data, and, for example, is at a step where a clamp process of clamping the black levels of R, G, and B to a predetermined level, a process of correction between R, G, and B color channels, or the like has been performed as preprocessing on a captured-image signal from the image-capturing element section 12 also is called RAW image data in some cases.

In addition, image data at a step where lens correction or noise reduction has been performed also is called RAW image data in some cases.

In the case of the present embodiment, the image processing section 20 has signal processing functionalities as a synthesis processing section 31 and a development processing section 32.

As mentioned later, the synthesis processing section 31 performs a synthesis process of synthesizing multiple pieces of PAW image data, each of which constitutes an image of one frame, to generate synthesized RAW image data.

The development processing section 32 performs a development process on the RAW image data or the synthesized RAW image data generated by the synthesis processing section 31 to perform a development process of generating image data in a predetermined format. For example, the development processing section 32 performs lens correction, noise reduction, synchronization process, a YC generation process, color reproduction/sharpness processing, and the like.

In the synchronization process, a color separation process of making image data of each pixel have color components of all of R, G, and B is implemented. For example, in a case of an image-capturing element using Bayer-array color filters, demosaicing is performed as the color separation process.

In the YC generation process, luminance (Y) signals and color (C) signals are generated (separated) from R, G, and B image data.

In the color reproduction/sharpness processing, a process of adjusting gradation, chrominance, tone, contrast, or the like as generally called image enhancement is performed.

These processes performed by the development processing section 32 are development processes in a broad sense, and particularly the color reproduction/sharpness processing is called a development process in a narrow sense. Since a part of information about original PAW image data has been lost from image data having been subjected to the development process in a narrow sense, the degree of freedom of subsequent image editing lowers.

In addition, image data at a step where the development process in a narrow sense has not been implemented on it can be said to be included in the meaning of RAW image data and YC-RAW image data according to the present disclosure.

The image processing section 20 performs the development processes in a broad sense by using the development processing section 32 in such a manner to generate image data in a predetermined format.

In this case, resolution conversion or a file formation process may also be performed. In the file formation process, for example, file generation for recording or communication is performed by performing compression/encoding, formatting, metadata generation or addition, or the like for recording or communication on image data.

For example, an image file in a format such as JPEG, TIFF (Tagged Image File Format), GIF (Graphics Interchange Format), HEIF, YTUV422, or YUV420 as a still image file is generated. In addition, it is conceivable also that an image file in a format such as an MP4 format used for recording of videos and sounds complying with MPEG-4 is generated.

Note that image files of RAW image data on which the development process has not been implemented are generated in some cases.

For example, the buffer memory 21 is formed by using a D-RAM (Dynamic Random Access Memory). The buffer memory 21 is used for temporary storage of image data in the course of the synthesis process or development process described above at the image processing section 20.

For example, the recording control section 14 performs recording/reproduction on and from a recording medium which is a non-volatile memory. For example, the recording control section 14 performs a process of recording an image file of video data, still image data, or the like on the recording medium.

There are diverse conceivable modes of the actual mode of the recording control section 14. For example, the recording control section 14 may be configured as a flash memory and a write/read circuit thereof that are built in the image-capturing apparatus 1. In addition, the recording control section 14 may have a form as a card recording/reproduction section that performs recording/reproduction access to a recording medium that can be attached to and removed from the image-capturing apparatus 1, for example, a memory card (a portable flash memory, etc.). In addition, the recording control section 14 is realized as an HDD (Hard Disk Drive) or the like as a form built in the image-capturing apparatus 1, in some cases.

The display section 15 is a display section that displays various types of information to a user, and, for example, is a view finder or a display panel which is a display device arranged on a housing of the image-capturing apparatus 1 such as a liquid crystal panel (LCD: Liquid Crystal Display) or an organic EL (Electro-Luminescence) display.

The display section 15 causes various types of information to be displayed on a display screen on the basis of an instruction from the camera control section 18.

For example, the display section 15 causes a reproduced image of image data read out from the recording medium at the recording control section 14 to be displayed.

In addition, the display section 15 is supplied with image data of a captured image resolution-converted at the image processing section 20 for display, and the display section 15 displays information on the basis of the image data of the captured image in accordance with an instruction from the camera control section 18, in some cases. Thereby, a generally called through image (monitoring image of an imaging subject) which is a captured image while a composition is being checked, a video is being recorded, and so on is displayed.

In addition, the display section 15 causes various types of manipulation menus, icons, messages, or the like, that is, a GUI (Graphical User Interface), to be displayed on the screen on the basis of an instruction from the camera control section 18.

The communication section 16 performs data communication or network communication with external equipment through wire or wirelessly. For example, the communication section 16 performs transmission output of a still image file or a video file including capture-image data and metadata to an external information processing apparatus, display apparatus, recording apparatus, reproducing apparatus, or the like.

In addition, as a network communication section, for example, the communication section 16 can perform communication by various types of networks such as the Internet, a home network, or a LAN (Local Area Network), and perform various types of data transmission/reception to and from servers, terminals, and the like on the networks.

In addition, for example, it may also be made possible for the image-capturing apparatus 1 to use the communication section 16 to perform mutual information communication with a PC, a smartphone, a tablet terminal, or the like by, for example, Bluetooth (registered trademark), Wi-Fi (registered trademark) communication, near field communication such as NFC (Near field communication), infrared communication, or the like. In addition, it may be made possible for the image-capturing apparatus 1 and other equipment to communicate with each other by wired connection communication.

Accordingly, the image-capturing apparatus 1 can use the communication section 16 to transmit captured images and metadata to an information processing apparatus 70 mentioned later.

The manipulation section 17 comprehensively represents input devices with which a user performs various types of manipulation inputs. Specifically, the manipulation section 17 represents various types of manipulation elements (a key, a dial, a touch panel, a touch pad etc.) provided on the housing of the image-capturing apparatus 1.

The manipulation section 17 detects user manipulation, and a signal according to the input manipulation is sent to the camera control section 18.

The camera control section 18 includes a microcomputer (calculation processing apparatus) including a CPU (Central Processing Unit).

The memory section 19 stores information or the like that the camera control section 18 uses for processes. The depicted memory section 19 comprehensively represents a ROM (Read Only Memory), a RAM (Random Access Memory), a flash memory, or the like, for example.

The memory section 19 may be a memory area built in a microcomputer chip as the camera control section 18 or may include a discrete memory chip.

The camera control section 18 executes a program stored on the ROM, the flash memory, or the like of the memory section 19 to thereby perform the overall control of the image-capturing apparatus 1.

For example, the camera control section 18 controls operation of each required section about control of the shutter speed of the image-capturing element section 12, image-capturing operation and recording operation in the image processing section 20 according to instructions for various types of signal processing and user manipulation, operation of reproducing recorded image files, operation of the lens system 11 such as zoom, focus, or aperture adjustment of the lens barrel, user interface operation, or the like.

The RAM in the memory section 19 is used for temporary storage of data, programs and the like as a work area to be used at times of various types of data processing by the CPU of the camera control section 18.

The ROM and flash memory (non-volatile memory) in the memory section 19 are used for storage of application programs, firmware, various types of settings information for various types of operations, and the like, in addition to an OS (Operating System) with which the CPU controls each section and content files such as image files.

For example, the driver section 22 is provided with a motor driver for a zoom lens drive motor, a motor driver for a focus lens drive motor, a motor driver for a motor of an aperture mechanism, and the like.

These motor drivers apply drive currents to the corresponding drivers in accordance with instructions from the camera control section 18, and causes them to execute movement of the focus lens or the zoom lens, opening and closure of aperture blades of the aperture mechanism, and the like.

The sensor section 23 comprehensively represents various types of sensors mounted on the image-capturing apparatus.

For example, in a case where an IMU (inertial measurement unit) is mounted as the sensor section 23, for example, an angular velocity (gyro) sensor can detect angular velocities along three axes, pitch, yaw, and roll, and an acceleration sensor can detect an acceleration.

In addition, as the sensor section 23, for example, a positional information sensor, an illuminance sensor, a distance measurement sensor, and the like are mounted in some cases.

Various types of information detected by the sensor section 23, for example, positional information, distance information, illuminance information, IMU data, and the like, are added as metadata to captured images along with date/time information managed by the camera control section 18.

3. Configuration of Information Processing Apparatus

Figure 3:
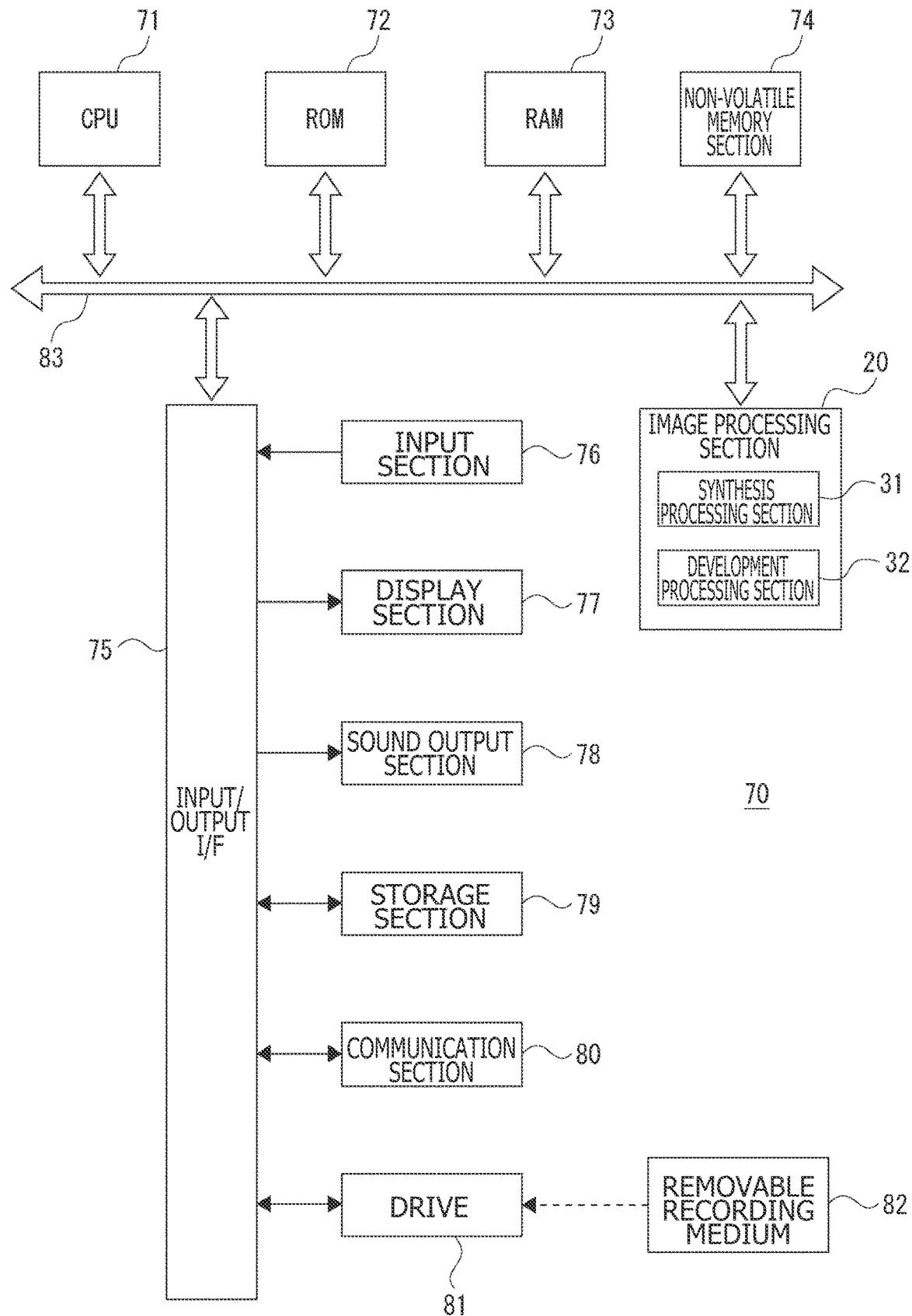
FIG. 3 is a block diagram of an information processing apparatus according to the embodiment.

Next, a configuration example of the information processing apparatus 70 is explained with reference to FIG. 3.

The information processing apparatus 70 is equipment such as computer equipment that is capable of information processing, particularly image processing.

Conceivable specific examples of the information processing apparatus 70 include a mobile terminal apparatus such as a personal computer (PC), a smartphone, or a tablet, a mobile phone, a video editing apparatus, video reproducing equipment, and the like. In addition, the information processing apparatus 70 may be a computer apparatus configured as a server apparatus or a calculation apparatus in cloud computing.

Then, the information processing apparatus 70 includes the image processing section 20 that performs a RAW image data synthesis process, and the image processing section 20, or the information processing apparatus 70 including the image processing section 20 can be regarded as an example of the image processing apparatus according to the present disclosure.

A CPU 71 of the information processing apparatus 70 executes various types of processes according to a program stored on a ROM 72 or a non-volatile memory section 74 such as an EEP-ROM (Electrically Erasable Programmable Read-Only Memory), for example, or a program loaded from a storage section 79 onto a RAM 73. The RAM 73 stores also data necessary for execution of various types of processes by the CPU 71, and the like as appropriate.

The image processing section 20 has functionalities as the synthesis processing section 31 and development processing section 32 that are explained regarding the image-capturing apparatus 1 mentioned above.

The synthesis processing section 31 and development processing section 32 as the image processing section 20 may be provided as functionalities in the CPU 71.

In addition, the image processing section 20 may be realized by a CPU which is discrete from the CPU 71, a GPU (Graphics Processing Unit), a GPGPU (General-purpose computing on graphics processing units), an AI (artificial intelligence) processor, or the like.

The CPU 71, the ROM 72, the RAM 73, the non-volatile memory section 74, and the image processing section 20 are interconnected via a bus 83. The bus 83 is also connected with an input/output interface 75.

The input/output interface 75 is connected with an input section 76 including manipulation elements and manipulation devices. For example, conceivable examples of the input section 76 include various types of manipulation elements and manipulation devices such as a keyboard, a mouse, a key, a dial, a touch panel, a touch pad, or a remote controller.

User manipulation is detected by the input section 76, and a signal according to the input manipulation is interpreted by the CPU 71.

Conceivable examples of the input section 76 include a microphone also. Sounds made by a user can also be input as manipulation information.

In addition, the input/output interface 75 is connected with a display section 77 including an LCD, an organic EL panel, or the like, and a sound output section 78 including a speaker or the like as integrated or discrete components.

The display section 77 is a display section that displays various types of information, and, for example, includes a display device provided to the housing of the information processing apparatus 70, a discrete display device connected to the information processing apparatus 70, or the like.

The display section 77 displays an image for various types of image processing, a processing-subject video, or the like on a display screen, on the basis of an instruction from the CPU 71. In addition, the display section 77 causes various types of manipulation menus, icons, messages, or the like, that is, a GUI (Graphical User Interface), to be displayed, on the basis of an instruction from the CPU 71.

The input/output interface 75 is connected with the storage section 79 including an HDD, a solid memory, and the like, and a communication section 80 including a modem and the like, in some cases.

The storage section 79 can store processing-subject data and various types of programs.

In a case where the information processing apparatus 70 functions as the image processing apparatus according to the present disclosure, it is conceivable also that the storage section 79 stores processing-subject image data (e.g. RAW image data) or stores synthesized RAW image data, JPEG image data obtained by performing a development process on synthesized RAW image data, and the like.

In addition, the storage section 79 stores programs for a synthesis process or a development process.

The communication section 80 performs a communication process via a transmission path such as the Internet and communication such as wired/wireless communication, bus communication, or the like with various types of equipment.

Communication, particularly reception of captured images, and the like, with the image-capturing apparatus 1 is performed by the communication section 80.

The input/output interface 75 is also connected with a drive 81 as necessary, and a removable recording medium 82 such as a magnetic disc, an optical disc, a magneto-optical disc, or a semiconductor memory is attached as appropriate.

By using the drive 81, data files such as image files, various types of computer programs and the like can be read out from the removable recording medium 82. The data files having been read out are stored on the storage section 79, images, or sounds included in the data files are output at the display section 77 or the sound output section 78, and so on. In addition, the computer programs or the like read out from the removable recording medium 82 are installed on the storage section 79 as necessary.

For example, software for processes according to the present embodiment can be installed on the information processing apparatus 70 via network communication by the communication section 80 or via the removable recording medium 82. Alternatively, the software may be stored in advance on the ROM 72, the storage section 79, or the like.

4. RAW Image Data Synthesis Process and Development Process

Hereinbelow, a RAW image data synthesis process and development process performed at the image processing section 20 in the image-capturing apparatus 1 or the information processing apparatus 70 are explained.

For example, the image processing section 20 performs a process of synthesizing multiple pieces of RAW image data for the purpose of editing a shutter speed after image-capturing to generate data of one synthesized RAW image or multiple synthesized RAW images.

Figure 4:
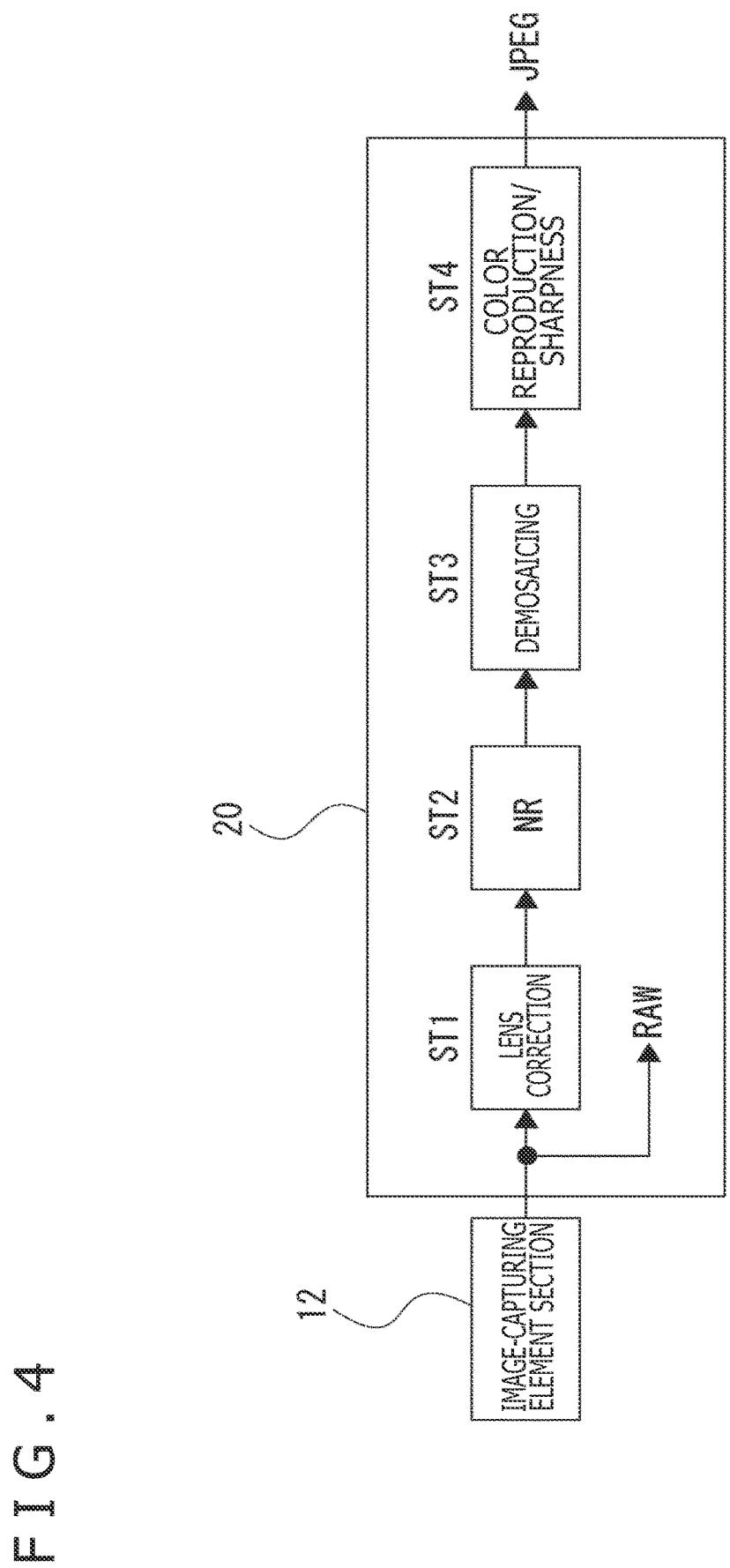
FIG. 4 is an explanatory diagram of RAW image data and a development process.

First, FIG. 4 schematically depicts the procedure of a development process at the image processing section 20.

For example, image data input from the image-capturing element section 12 itself or image data input from the image-capturing element section 12 having been subjected to preprocessing which is not depicted is treated as RAW image data.

Note that FIG. 4 depicts an example in which image data input from the image-capturing element section 12 is RAW image data supposing that the image-capturing apparatus 1 is used. However, for example, in a case of the information processing apparatus 70, it is sufficient if image data read out from the storage section 79 is regarded as RAW image data.

As a development process in a broad sense, for example, lens correction at Step ST1, NR (noise reduction) at Step ST2, demosaicing at Step ST3, and then color reproduction/sharpness processing at Step ST4 which is a development process in a narrow sense are performed.

Then, for example, JPEG image data is generated as image data after such a development process.

Figure 5:
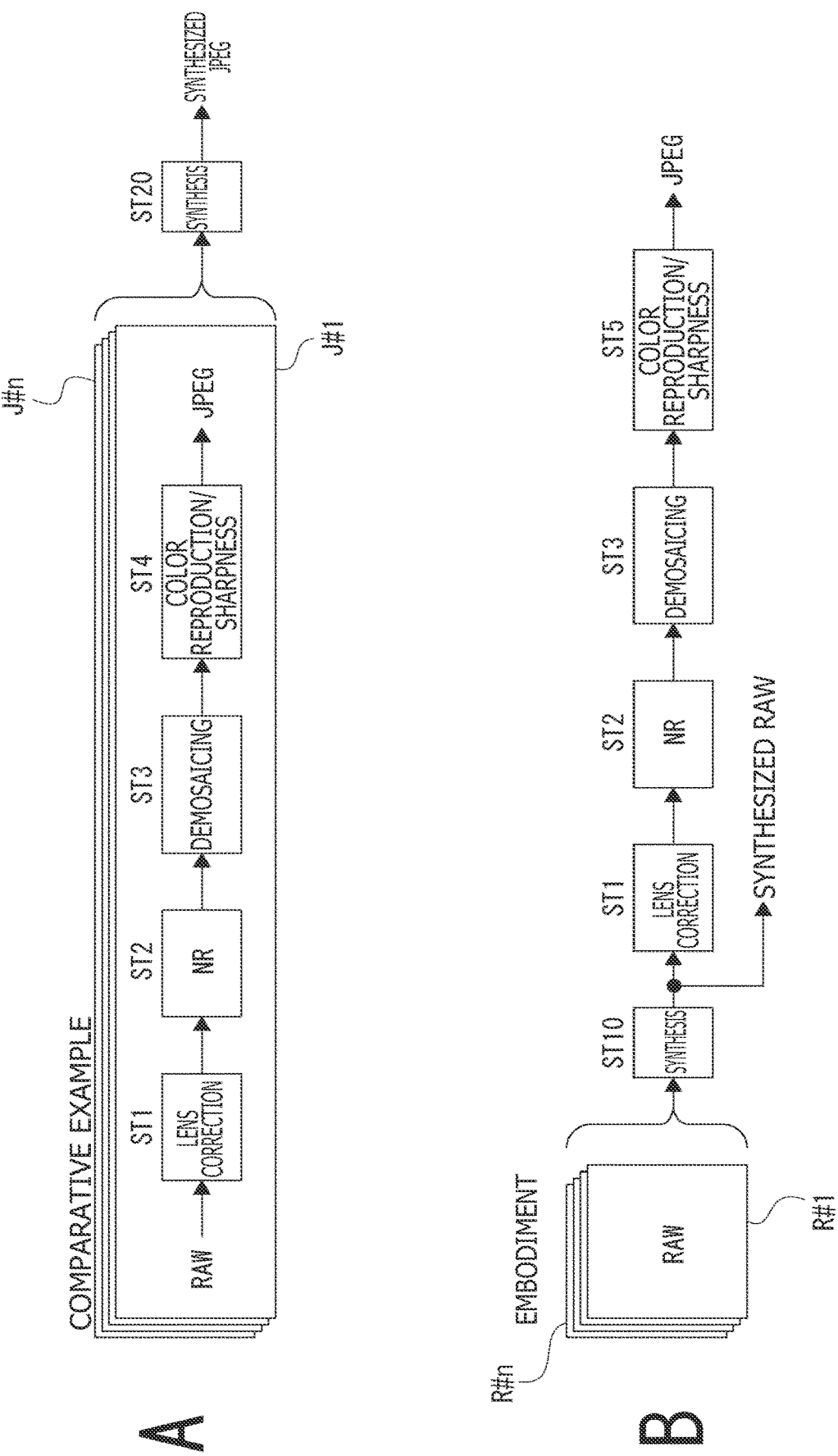
FIG. 5 is an explanatory diagram of synthesis processes and development processes according to the embodiment and a comparative example.

A comparative example and an embodiment are depicted as relations between such a development process and a synthesis process in FIG. 5A and FIG. 5B.

FIG. 5A depicts a comparative example for comparison with the embodiment, and each of them depicts multiple pieces of JPEG image data (J #1 to J #n) generated through a development process (Steps ST1, ST2, ST3, ST4) on RAW image data.

By implementing a synthesis process on this multiple pieces of JPEG image data (J #1 to J #n) as Step ST20, synthesized JPEG image data is generated.

Conceivable examples of the process of synthesizing the multiple images include synthesis of multiple pieces of JPEG image data (J #1 to J #n) after the development process as in the comparative example.

Meanwhile, in this case, a problem like the one mentioned below can be pointed out.

First, the development process in a broad sense (Steps ST1, ST2, ST3, ST4) is necessary for each of the multiple pieces of image data used for the synthesis. This increases processing load in a case where only synthesized images are target images, although, for example, there are no problems if each of the individual pieces of JPEG image data (J #1 to J #n) also is a subject of storage.

In addition, the development process is performed in signal processing optimized for each piece of image data. Because of this, the development process is not necessary signal processing optimum for image data after synthesis.

In addition, the editability of the image after the synthesis is limited since a development process has already been performed. This is because, particularly, part of information that exists at a time point when the image is RAW image data is lost because color information or the like is thinned out in the color reproduction/sharpness processing at Step ST4, and so on.

In view of this, in the present embodiment, a synthesis process like the one depicted in FIG. 5B is performed.

FIG. 5B depicts multiple pieces of RAW image data (R #1 to R #n) as image data to be treated as subjects of the synthesis process.

For example, a synthesis process at Step ST10 is performed on the multiple pieces of RAW image data (R #1 to R #n). Thereby, synthesized RAW image data is obtained.

In addition, a development process at Steps ST1, ST2, ST3, and ST4 is performed on the synthesized RAW image data. Thereby, JPEG image data as a synthesized image is generated.

By doing so, the development process needs to be performed only once after the synthesis, and signal processing load is reduced. In addition, since the development process can be performed by using parameters optimized for the synthesized RAW image data after the synthesis, the image quality of developed image data to be generated, for example, the JPEG image data described above, can be enhanced.

In addition, since information loss due to image enhancement such as color reproduction/sharpness processing does not occur to the synthesized RAW image data which has not been subjected to such image enhancement, for example, the synthesized RAW image data has high editability in terms of color reproduction and the like.

In such a manner, by performing synthesis on multiple pieces of RAW image data, it becomes possible to perform signal processing that is optimized for a synthesized image and is made efficient.

In a case to be considered here, it is supposed that the multiple pieces of RAW image data (R #1 to R #n) are image data that has been recorded temporally consecutively.

As a result, it becomes possible to generate a synthesized image of a shutter speed which is the product of multiplication of the shutter speed at a time of imaging-capturing of data of one RAW image with the number of images to be synthesized.

For example, supposing that the shutter speed is 1/100 seconds, if data of 100 consecutively captured RAW images is synthesized, a synthesized image of a shutter speed of one second can be obtained.

Shutter speeds can be edited after image-capturing by such a way of thinking.

Process examples for this are explained with reference to FIG. 6 and FIG. 7.

Figure 6:
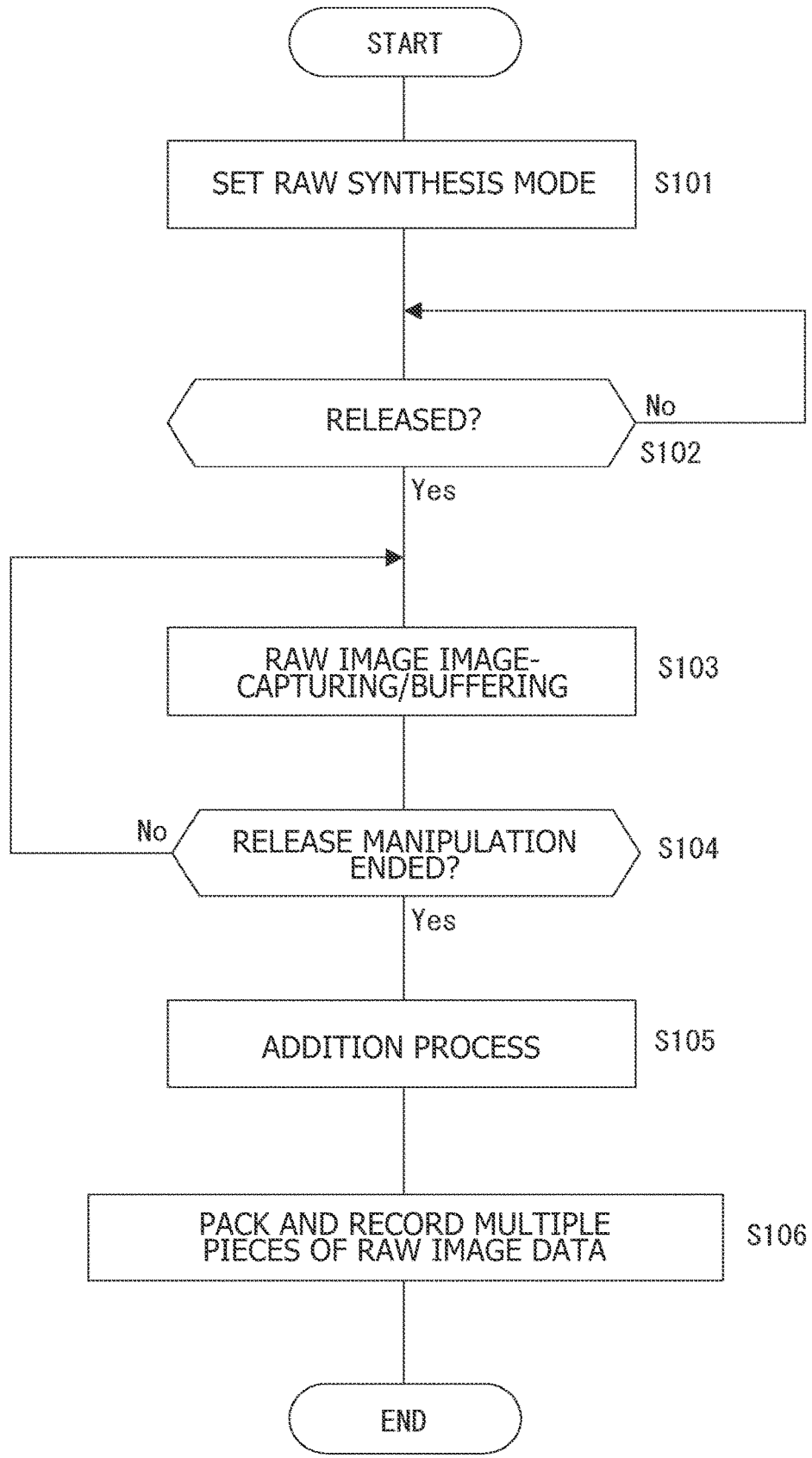
FIG. 6 is a flowchart of a process performed at a time of image-capturing according to the embodiment.

First, FIG. 6 depicts a process example at a time of imaging-capturing with the image-capturing apparatus 1.

It is made possible for a user to select a RAW synthesis mode with the image-capturing apparatus 1. In a case where a user performed manipulation to select the RAW synthesis mode, the image processing section 20 performs the depicted process under the control of the camera control section 18.

At Step S101, the image processing section 20 sets the mode to the RAW synthesis mode on the basis of an instruction from the camera control section 18. This setting is for an operation mode in which processes at and after Step S103 are performed.

At Step S102, the image processing section 20 waits for release manipulation.

For example, the user performs release manipulation in a manner of consecutive image-capturing by, for example, keeping pressing a shutter button, and so on.

In a case where the release manipulation by the user is detected by the camera control section 18, the image processing section 20 proceeds from Step S102 to Step S103 in accordance with a release instruction from the camera control section 18, and performs subsequent processes.

When the release manipulation is performed, the image-capturing element section 12 performs operation of consecutive image-capturing. For example, along with image-capturing operation with a constant shutter speed, image data is sequentially sent to the image processing section 20.

At Step S103, the image processing section 20 buffers the RAW image data. That is, a process of storing the RAW image data of one frame input from the image-capturing element section 12 on the buffer memory 21 is performed.

The image processing section 20 repeats the process of Step S103 while monitoring whether a notification of the end of the release manipulation has been received from the camera control section 18 at Step S104.

Thereby, multiple pieces of RAW image data are buffered in the period until the end of the release manipulation.

When the release manipulation has ended, the image processing section 20 proceeds to Step S105 and performs an addition process on each of the multiple pieces of RAW image data temporarily stored on the buffer memory 21. This addition process is a process of making the exposure periods of the multiple pieces of RAW image data temporally consecutive, that is, a process of making the exposure periods uninterrupted. Specifically, this is a process of adding an exposure amount equivalent to non-exposure periods of the image sensor 12a to each of the multiple pieces of RAW image data relative to an exposure amount in exposure periods of the image sensor 12a.

Note that the addition process at Step S105 does not necessarily have to be started after the end of the release manipulation. The addition process at Step S105 may be started in a period in which the consecutive image-capturing is being performed.

In addition, whereas a specific example of the addition process at Step S105 is explained below with reference to FIG. 8, this addition process itself is not performed in some cases. That is, it is conceivable also that there can be a process example not including Step S105 in FIG. 6.

FIG. 8 depicts exposure periods Ta and read periods Tb for reading out electric charges accumulated due to exposure, as image-capturing operation by the image sensor 12a. Note that whereas actually there are also periods in which neither exposure operation nor read operation is performed, reset periods, and the like, it is supposed that they are included in the read periods Tb for simplification of illustration and explanation.

Whereas image data of one frame is obtained by operation in an exposure period Ta and a read period Tb, the exposure periods Ta and the read periods Tb are repeated since consecutive image-capturing is performed.

Meanwhile, exposure is not performed at the image sensor 12a in the read periods Tb. This means that even if multiple pieces of RAW image data are synthesized with no changes being made thereto, this is not precisely equivalent to a simple reduction of a shutter speed.

Certainly, since a synthesis process in a sense that a shutter speed is edited does not necessarily have to be a synthesis process in a strict sense, editing of a shutter speed in a spurious sense can be performed also by synthesizing multiple pieces of PAW image data that has interruptions between exposure periods Ta in such a manner.

In that case, the addition process at Step S105 may be made unnecessary.

On the other hand, in order to realize editing of a shutter speed in an accurate sense, it is appropriate to synthesize multiple pieces of RAW image data with uninterrupted exposure periods Ta.

Actually, there are interruptions between exposure periods Ta due to the necessity for read periods Tb, but by performing a process of adding, to pixel values, exposure amounts as pixel information of the read periods, image data with uninterrupted exposure periods Ta is generated.

As an example, a pixel value that would have been obtained in a case where exposure is performed also in a read period Tb is calculated by performing an interpolation calculation of each pixel value of one frame taking into consideration a ratio between period-lengths of exposure periods Ta and read periods Tb or an amount of a change between pixel values before an addition process of the preceding and subsequent frames. Then, the addition process is performed for each of pixel values in such a manner to generate RAW image data R #1, R #2, R #3 . . . .

Thereby, the RAW image data R #1, R #2, R #3 . . . can be multiple pieces of RAW image data with uninterrupted exposure periods Ta.

Note that, by providing multiple image sensors 12a1 and 12a2 to the image-capturing element section 12, multiple pieces of RAW image data that do not have interruptions between exposure periods Ta can be obtained without performing the addition process.

As depicted in FIG. 9, for example, the RAW image data R #1 is obtained from an output of the image sensor 12al. Next, the RAW image data R #2 is obtained from an output of the image sensor 12a2.

At this time, the image sensor 12al and the image sensor 12a2 are caused to operate in a synchronized state where their exposure timings do not match. That is, as depicted in the figure, an exposure period Ta of the image sensor 12a2 is started at the end timing of an exposure period Ta of the image sensor 12al, and an exposure period Ta of the image sensor 12al is started at the end timing of the exposure period Ta of the image sensor 12a2.

By doing so, the RAW image data R #1, R #2, R #3, R #4 . . . that is obtained alternately from the image sensors 12al and 12a2 becomes image data with consecutive exposure periods.

In addition, even in a case where the only one image sensor 12a is used, the addition process does not have to be performed in a case where the image sensor 12a is one whose interruptions between exposure periods due to read periods Tb are almost negligible or depending on purposes as in a case where an image that is desired to be obtained finally is an image in which there are no moving imaging subjects. In other words, the addition process may be enabled in a case of an image-capturing apparatus or an image-capturing scene that is significantly influenced by interruptions between exposure periods.

After the addition process is performed at Step S105 in FIG. 6 or after it is assessed at Step S104 that the release manipulation has ended in a case where the addition process at Step S105 is not performed as a process in FIG. 6, at Step S106, the image processing section 20 packs the multiple pieces of RAW image data R #1, R #2, . . . into a set of image data, and records the set of image data. For example, the packing can be performed by using HEIF.

For example, the multiple pieces of RAW image data are transferred from the image processing section 20 to the recording control section 14, and are recorded on a recording medium as a set of grouped image data. Alternatively, as a set of grouped image data, the multiple pieces of RAW image data may be transmitted from the communication section 16 to external equipment, for example, the information processing apparatus 70.

Figure 7:
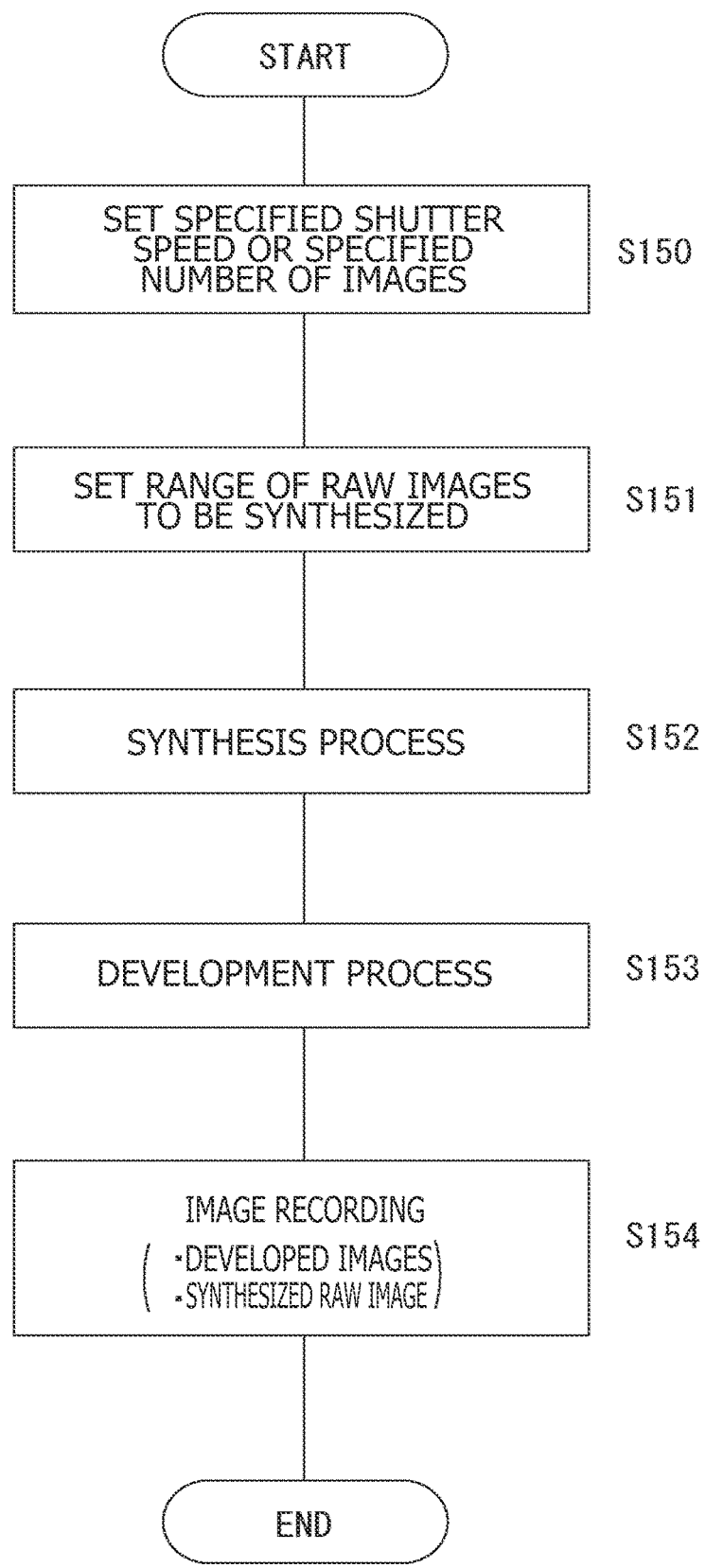
FIG. 7 is a flowchart including the synthesis process and the development process according to the embodiment.

Editing of a shutter speed after image-capturing can be performed on the thus-packed multiple pieces of RAW image data at the image-capturing apparatus 1 or the information processing apparatus 70 by the process in FIG. 7.

In a case of the image-capturing apparatus 1, the process is performed on a set of RAW image data recorded on a recording medium.

In addition, in a case of the information processing apparatus 70, the process in FIG. 7 can be performed on a set of RAW image data stored on the storage section 79 by being received from the image-capturing apparatus 1 or taken in via the removable recording medium 82.

At Step S150, the image processing section 20 sets a specified shutter speed or a specified number of images to be synthesized.

For example, it is made possible for a user to specify any shutter speed or any number of images to be synthesized by using the manipulation section 17 (or the input section 76) as a user interface.

When having detected user manipulation, the camera control section 18 (or the CPU 71) gives the image processing section 20 a notification to that effect. Thereby, a shutter speed or the number of images to be synthesized is set at the image processing section 20.

Setting a shutter speed means calculating the number of images of RAW image data to be treated as subjects of the synthesis process by dividing the demanded shutter speed by a shutter speed at which image-capturing has been performed.

In addition, setting the number of images means deciding the number of images of RAW image data to be treated as subjects of the synthesis process with no changes being made thereto.

At Step S151, the image processing section 20 sets a range of RAW image data to be synthesized. For example, suppose that data of 50 RAW image data, RAW image data R #1 to synthesized RAW image data R #50, has been packed as temporally consecutive image data. In this case, a range from a start image, which is the temporally first image, to an end image, which is the temporally last image, in the 50 images is set.

For example, the range from the synthesized RAW image data R #10 to the RAW image data R #30 is set as a range of images to be synthesized, or the like.

According to manipulation performed by a user to specify a start image, an end image is determined from the start image on the basis of a specified shutter speed (or specified number of images), and a range of subjects to be synthesized is decided.

Note that since the shutter speed or number of images is set at Step S150 in this process example, a range of image data to be synthesized can be set as long as either a start image or an end image is specified by a user at Step S151.

In contrast to this, it may be made possible to obtain a synthesized image of any shutter speed by a user not specifying a shutter speed or the number of images, but specifying a start image and an end image as desired.

At Step S152, the image processing section 20 performs a process of synthesizing multiple pieces of RAW image data in the range set at Step S151.

Note that, at this time, a simple synthesis process of synthesizing (e.g. averaging) pixel values of each pixel unit may be performed or a synthesis process of synthesizing multiple images may be performed with different values being given as weight to the multiple images. In addition, a synthesis process may be performed to generate an image in which a particular portion of an imaging subject is not blurred, by performing the synthesis while fixing the pixel position of the particular portion in a synthesized RAW image.

With the synthesis process, synthesized RAW image data is obtained.

At Step S153, the image processing section 20 performs a development process on the synthesized RAW image data. Thereby, for example, JPEG image data is generated.

At Step S154, the image processing section 20 outputs the image data to be recorded. For example, in a case of the image-capturing apparatus 1, the JPEG image data or synthesized RAW image data is transferred to the recording control section 14, and the recording control section 14 is caused to record the JPEG image data or synthesized RAW image data on a recording medium. In a case of the information processing apparatus 70, the image processing section 20 transfers the JPEG image data or synthesized RAW image data to the storage section 79, and causes the storage section 79 to record the JPEG image data or synthesized RAW image data.

Note that the image data to be recorded may be only the JPEG image data having been subjected to the development process, and there can be cases where only the synthesized RAW image data is the image to be recorded.

If the synthesized PAW image data is recorded, it becomes possible to perform an image editing/development process on the synthesized image with a high degree of freedom at any point thereafter also.

The thus-recorded JPEG image data or synthesized RAW image data can be said to be image data edited to be equivalent to data of an image captured at any shutter speed after image-capturing.

5. YC-RAW Image Data Synthesis Process and Development Process

Although the synthesis process is performed on the RAW image data obtained by the image-capturing element section 12 in the example above, it is conceivable also that YC-RAW image data in a luminance-value/chroma-value format is synthesized in the same way of thinking. The following explains a case of YC-RAW image data.

Note that, for convenience of explanation, PAW image data in an RGB format obtained by the image-capturing element section 12 is written below as "RGB-RAW image data" in order to make a distinction from YC-RAW image data. In addition, synthesized RAW image data generated from RGB-RAW image data is called "synthesized RGB-RAW image data."

FIG. 10 depicts the procedure of processes performed by the image processing section 20 in a case where YC-RAW image data is obtained.

As a development process in a broad sense, for example, the lens correction at Step ST1, the NR at Step ST2, the demosaicing at Step ST3, and then the color reproduction/sharpness processing at Step ST4, which is a development process in a narrow sense, are performed on RGB-RAW image data input from the image-capturing element section 12, and thereby JPEG image data is generated, for example.

In this case, YC-RAW image data is obtained by performing YC conversion at Step ST5 after the demosaicing.

Note that, in the generation of YC-RAW image data, the lens correction at Step ST1 and the NR at Step ST2 do not have to be performed.

For example, by packing multiple pieces of temporally consecutive data into a set, and recording the set as such YC-RAW image data, a synthesis process using the multiple pieces of YC-RAW image data at a later time point becomes possible.

Particularly, since YC-RAW image data is in the state before the color reproduction/sharpness processing is implemented on YC-RAW image data, information that is retained when it is RAW image data is not lost. Accordingly, merits similar to those in the case of synthesis of RAW image data mentioned above can be attained.

FIGS. 11A, 11B, and 11C depict examples of a synthesis process using YC-RAW image data.

FIG. 11A depicts multiple pieces of YC-RAW image data (YCR #1 to YCR #n). In this example, a synthesis process is performed as Step ST11 on the multiple pieces of YC-RAW image data to generate synthesized YC-RAW image data. In addition, the color reproduction/sharpness processing at Step ST4 is performed on the synthesized YC-RAW image data, and developed image data as a synthesized image such as JPEG image data, for example, can be generated.

FIG. 11B depicts an example in which the synthesis process at Step ST10 is performed on multiple pieces of RGB-RAW image data (R #1 to R #n) to generate synthesized RGB-RAW image data, and also the processes at Steps ST1, ST2, ST3, and ST5 are performed to generate synthesized YC-RAW image data.

FIG. 11C depicts an example in which each of multiple pieces of YC-RAW image data is converted back to RGB-RAW image data (R #1 to R #n) and then is synthesized. The synthesis process at Step ST10 is performed on the multiple pieces of RGB-RAW image data (R #1 to R #n) obtained by the reverse-conversion from the multiple pieces of YC-RAW image data to generate synthesized RGB-RAW image data, and also the processes at Steps ST1, ST2, ST3, and ST4 are performed to generate, for example, JPEG image data as a synthesized image.

Various types of synthesis process examples using YC-PAW image data like the examples above are also conceivable.

6. Summary and Modification Examples

According to the embodiment above, advantageous effects like the ones mentioned below can be attained.

The image processing apparatus according to the embodiment, that is, the image processing section 20 (or the image-capturing apparatus 1 or information processing apparatus 70 including the image processing section 20), includes the synthesis processing section 31 that synthesizes multiple pieces of RAW image data, each of which constitutes an image of one frame, to generate synthesized RAW image data.

Performing the synthesis process of synthesizing the multiple pieces of image data at a step where the multiple pieces of image data are RAW image data means synthesizing the multiple pieces of image data on which a development process has not been implemented, and thereafter performing the development process. Then, performing the development process on synthesized RAW image data to generate JPEG image data or the like means being able to perform a development process suited for the synthesized RAW image data.

The multiple pieces of RAW image data which are treated as subjects of the synthesis may be ones captured as temporally consecutive still images or may be RAW image data of each frame captured as a video. Furthermore, the multiple pieces of RAW image data which are treated as subjects of the synthesis may be multiple pieces of RAW image data that are mutually unrelated such as those not having a relation in terms of image-capturing times, a relation in terms of imaging subjects or the like. That is, it is conceivable also that any multiple pieces of RAW image data selected by a user are synthesized.

The image processing section 20 according to the embodiment further includes the development processing section 32 that performs a development process on the synthesized RAW image data generated by the synthesis processing section 31 to generate image data in a predetermined format.

By doing so, the development process is performed with various types of parameters suited for the synthesized RAW image data, and image data in a predetermined format after the synthesis such as JPEG image data, for example, can be obtained. Accordingly, enhancement of the image quality of a synthesized image to be generated (e.g. an image of JPEG image data) can be realized.

In addition, since a development process does not have to be performed for each of the multiple pieces of RAW image data before being synthesized, higher efficiency of the development process can be realized.

In addition, since the synthesized PAW image data is one that has been obtained by synthesizing the RAW image data before the development process including a compression process or the like, and a lot of information is left as original images, this has also the merit of an increase of the degree of freedom at a time of image enhancement by a user.

In addition, storage of the synthesized RAW image data is suited also for performing development in the future in a state where the development process technology has progressed.

In an example above, the synthesis processing section 31 according to the embodiment generates, by a synthesis process, synthesized RAW image data equivalent to an image captured at a shutter speed slower than a shutter speed at a time of image-capturing.

For example, by synthesizing multiple pieces of RAW image data having related imaging-subject content, it is possible to obtain synthesized RAW image data equivalent to an image captured at a shutter speed slower than a shutter speed at times of image-capturing of the individual pieces of RAW image data.

In an example above according to the embodiment, the multiple pieces of PAW image data synthesized by the synthesis processing section 31 are RAW image data of multiple temporally consecutive frames.

Thereby, for example, it becomes possible to generate an image as if it is captured at a shutter speed slower than a shutter speed at times of image-capturing of images, after the image-capturing. That is, it becomes possible to edit the shutter speed after the image-capturing.

In addition, it is possible thereby to prevent a failure due to a setting mistake of a shutter speed at a rarely occurring shutter chance, for example.

There will no longer be a case where one misses a shutter chance for a reason that adjustment of the shutter speed took a long time.

In addition, since this does not accompany a change of the shutter speed at a time of image-capturing, it is not necessary to adjust the light amount, and, in this condition, a synthesized image of any shutter speed can be obtained from images captured with the appropriate light amount.

Furthermore, fine adjustment of shutter speeds after image-capturing leads to new image expressions.

In addition, a development process can be performed on synthesized RAW image data obtained after the shutter speed is edited.

In an example above according to the embodiment, the multiple pieces of RAW image data synthesized by the synthesis processing section 31 are RAW image data of multiple temporally consecutive frames captured at a constant shutter speed.

The multiple pieces of PAW image data obtained by image-capturing are image data of the same shutter speed. Accordingly, a synthesized image of any shutter speed can be obtained by simply setting a range of RAW image data to be synthesized.

In an example above according to the embodiment, the multiple pieces of RAW image data synthesized by the synthesis processing section 31 are multiple pieces of RAW image data that are temporally adjacent to each other, and have exposure periods that are made temporally mutually consecutive (see FIG. 8 and FIG. 9).

Since the multiple pieces of RAW image data have exposure periods that are made consecutive to be uninterrupted, the synthesized RAW image data actually becomes image data that can be treated equivalently as an image captured at a shutter speed slower than a shutter speed at a time of image-capturing. That is, editing of a shutter speed in a true sense that is equivalent to a long or short consecutive exposure period becomes possible.

Thereby, it is possible to realize a change of a shutter speed after image-capturing which is normally not possible after the image-capturing.

In an example above according to the embodiment, the multiple pieces of RAW image data synthesized by the synthesis processing section 31 have exposure periods that are made temporally consecutive by performing an addition process of adding exposure amounts equivalent to non-exposure periods of an image-capturing element relative to exposure amounts in exposure periods of the image-capturing element (see FIG. 8).

Thereby, the multiple pieces of RAW image data can be regarded as data that has been obtained in a state where there are no non-exposure periods, even if there are non-exposure periods such as read periods or electric charge reset period. Accordingly, the synthesis process can be performed treating the series of RAW image data as multiple pieces of RAW image data having exposure periods that are made temporally consecutive.

Also, in an example above according to the embodiment, the multiple pieces of PAW image data synthesized by the synthesis processing section 31 have exposure periods that are made temporally consecutive by causing the multiple image sensors 12*a*1 and 12*a*2 to sequentially read out the multiple pieces of RAW image data alternately (see FIG. 9).

Since the multiple image sensors 12*a*1 and 12*a*2 are used, exposure timings of the image sensors 12*a*1 and 12*a*2 are set such that exposure is performed with one image sensor in a non-exposure period of the other image sensor and the multiple pieces of PAW image data are RAW image data read out alternately and sequentially from the image sensors 12*al* and 12*a*2, the series of RAW image data becomes multiple pieces of RAW image data having exposure periods that are made temporally consecutive.

In an example above according to the embodiment, the synthesis processing section 31 selects synthesis-subject RAW image data to be treated as a subject of a synthesis process from multiple pieces of temporally consecutive RAW image data, on the basis of specification of a shutter speed (see FIG. 7).

Thereby, a synthesis process according to manipulation to specify the shutter speed by a user is performed, and the synthesized RAW image data becomes an image generated as if it is captured at the specified shutter speed. Usability becomes good in terms of editing of shutter speeds.

In addition, also in an example above according to the embodiment, the synthesis processing section 31 selects synthesis-subject RAW image data to be treated as a subject of a synthesis process from multiple pieces of temporally consecutive RAW image data on the basis of specification of the number of images (see FIG. 7).

Thereby, a synthesis process according to manipulation to specify the number of images by a user is performed, and the synthesized RAW image data becomes a synthesized image of the specified number of images. The user is given a specification approach which is different from specification by a shutter speed, and this gives higher usability for the user.

Note that, by making it possible to switch between a manipulation mode in which a user specifies a shutter speed and a manipulation mode in which the user specifies the number of images, usability suited for a preference of the user is realized.

In an example above according to the embodiment, the RAW image data is RGB-RAW image data having a color array that is the same as a color array of an image-capturing element.

For example, it is image data in an RGB format. Conceivable cases include a case where the image data includes pixel values of each pixel of G1, G2, R, and B in a case of the Bayer array and a case where the image data is image data obtained by implementing some of the processes mentioned above on the pixel values. RAW image data represented by such pixel values is original image information read out from the image-capturing element section 12, and provides a high degree of freedom also in a development process after synthesis.

In addition, in an example above according to the embodiment, the RAW image data is YC-RAW image data in which pixel values read out from an image-capturing element are in a luminance-value/chroma-value format, and has not been subjected to color reproduction/sharpness processing.

By synthesizing the YC-RAW image data and performing a synthesis process also on it, the efficiency of a development process is enhanced. In addition, since the YC-RAW image data can also be converted back to RAW image data, a synthesis process after reverse-conversion to RAW image data and a development process thereafter also become possible.

Programs according to the embodiment are programs that cause, for example, a CPU, a DSP, a GPU, a GPGPU, an AI processor, or the like, or a device including these to execute processes like those in FIG. 6 or FIG. 7 mentioned above.

That is, the programs according to the embodiment are programs that cause an information processing apparatus to execute a synthesis process of synthesizing multiple pieces of PAW image data, each of which constitutes an image of one frame, to generate synthesized RAW image data.

By such programs, the image processing apparatus according to the present disclosure can be realized with various types of computer apparatuses.

These programs can be recorded in advance on an HDD as a recording medium built in equipment such as a computer apparatus, a ROM in a microcomputer having a CPU, or the like.

Alternatively, the programs can be stored (recorded) temporarily or permanently on a removable recording medium such as a flexible disc, a CD-ROM (Compact Disc Read Only Memory), an MO (Magneto Optical) disc, a DVD (Digital Versatile Disc), a Blu-ray disc (registered trademark), a magnetic disc, a semiconductor memory or a memory card. Such a removable recording medium can be provided as generally called package software.

In addition, such programs can also be downloaded from a download site via a network such as a LAN (Local Area Network) or the Internet, other than being installed from a removable recording medium on a personal computer or the like.

In addition, such programs are suited for widely providing the image processing apparatus according to the present disclosure. For example, by downloading the programs onto a mobile terminal apparatus such as a smartphone or a tablet, a mobile phone, a personal computer, a game machine, video equipment, a PDA (Personal Digital Assistant), or the like, it is possible to cause those types of equipment to function as the image processing apparatus according to the present disclosure.

Note that advantageous effects described in the present specification are presented merely for illustrative purposes, but not for limiting the advantageous effects. There may be other advantageous effects.

Note that the present technology can also be implemented in such following configurations.

(1)

An image processing apparatus including:
    a synthesis processing section that synthesizes multiple pieces of RAW image data, each of which constitutes an image of one frame, to generate synthesized RAW image data.

(2)

The image processing apparatus according to (1) above, further including:
    a development processing section that performs a development process on the synthesized RAW image data generated by the synthesis processing section, to generate image data in a predetermined format.

(3)

The image processing apparatus according to (1) or (2) above, in which
    the synthesis processing section generates, by a synthesis process, synthesized RAW image data equivalent to an image captured at a shutter speed slower than a shutter speed at a time of image-capturing.

(4)

The image processing apparatus according to any one of (1) to (3) above, in which
    the multiple pieces of RAW image data synthesized by the synthesis processing section are RAW image data of multiple temporally consecutive frames.

(5)

The image processing apparatus according to any one of (1) to (4) above, in which
    the multiple pieces of RAW image data synthesized by the synthesis processing section are RAW image data of multiple temporally consecutive frames captured at a constant shutter speed.

(6)

The image processing apparatus according to any one of (1) to (5) above, in which
    the multiple pieces of RAW image data synthesized by the synthesis processing section are multiple pieces of RAW image data that are temporally adjacent to each other, and have exposure periods that are made temporally mutually consecutive.

(7)

The image processing apparatus according to (6) above, in which the multiple pieces of RAW image data synthesized by the synthesis processing section have exposure periods that are made temporally consecutive by performing an addition process of adding an exposure amount equivalent to non-exposure periods of an image-capturing element relative to an exposure amount in exposure periods of the image-capturing element.

(8)

The image processing apparatus according to (6) above, in which the multiple pieces of RAW image data synthesized by the synthesis processing section have exposure periods that are made temporally consecutive by causing multiple image-capturing elements to sequentially read out the multiple pieces of RAW image data alternately.

(9)

The image processing apparatus according to any one of (1) to (8) above, in which the synthesis processing section selects synthesis-subject RAW image data to be treated as a subject of a synthesis process from multiple pieces of temporally consecutive RAW image data, on the basis of specification of a shutter speed.

(10)

The image processing apparatus according to any one of (1) to (9) above, in which the synthesis processing section selects synthesis-subject RAW image data to be treated as a subject of a synthesis process from multiple pieces of temporally consecutive RAW image data, on the basis of specification of the number of images.

(11)

The image processing apparatus according to any one of (1) to (10) above, in which the RAW image data is image data having a color array that is the same as a color array of an image-capturing element.

(12)

The image processing apparatus according to any one of (1) to (10) above, in which the RAW image data is image data in which pixel values read out from an image-capturing element are in a luminance-value/chroma-value format, and has not been subjected to color reproduction/sharpness processing.

(13)

An image processing method executed by an image processing apparatus, the method including:

a synthesis process of synthesizing multiple pieces of RAW image data, each of which constitutes an image of one frame, to generate synthesized RAW image data.

(14)

A program for causing an information processing apparatus to execute:

a synthesis process of synthesizing multiple pieces of RAW image data, each of which constitutes an image of one frame, to generate synthesized RAW image data.

REFERENCE SIGNS LIST

1: Image-capturing apparatus
12: Image-capturing element section
12a, 12a1, 12a2: Image sensor
14: Recording control section
15: Display section
16: Communication section
17: Manipulation section
18: Camera control section
19: Memory section
20: Image processing section
21: Buffer memory
31: Image synthesizing section
32: Development processing section
70: Information processing apparatus
71: CPU
79: Storage section
80: Communication section

The invention claimed is:

1. An image processing apparatus comprising:
a memory storing a program, and
at least one processor configured to execute the program to perform operations comprising:
performing a synthesis processing that synthesizes multiple pieces of RAW image data, each of which constitutes an image of one frame, to generate synthesized RAW image data, wherein
the multiple pieces of RAW image data synthesized by the synthesis processing are multiple pieces of RAW image data that are temporally adjacent to each other, and have exposure periods that are made temporally mutually consecutive, and
the multiple pieces of RAW image data synthesized by the synthesis processing have exposure periods that are made temporally consecutive by performing an addition process of adding an exposure amount equivalent to non-exposure periods of an image-capturing element relative to an exposure amount in exposure periods of the image-capturing element.

2. The image processing apparatus according to claim 1, wherein the operations further comprise:
performing a development process on the synthesized RAW image data generated by the synthesis processing, to generate image data in a predetermined format.

3. The image processing apparatus according to claim 1, wherein the synthesis processing generates, by a synthesis process, synthesized RAW image data equivalent to an image captured at a shutter speed slower than a shutter speed at a time of image-capturing.

4. The image processing apparatus according to claim 1, wherein the multiple pieces of RAW image data synthesized by the synthesis processing are RAW image data of multiple temporally consecutive frames.

5. The image processing apparatus according to claim 1, wherein the multiple pieces of RAW image data synthesized by the synthesis processing are RAW image data of multiple temporally consecutive frames captured at a constant shutter speed.

6. The image processing apparatus according to claim 1, wherein the synthesis processing selects synthesis-subject RAW image data to be treated as a subject of a synthesis process from multiple pieces of temporally consecutive RAW image data, on a basis of specification of a shutter speed.

7. The image processing apparatus according to claim 1, wherein the synthesis processing selects synthesis-subject RAW image data to be treated as a subject of a synthesis process from multiple pieces of temporally consecutive RAW image data, on a basis of specification of the number of images.

8. The image processing apparatus according to claim 1, wherein the RAW image data is image data having a color array that is the same as a color array of an image-capturing element.

9. The image processing apparatus according to claim 1, wherein the RAW image data is image data in which pixel values read out from an image-capturing element are in a luminance-value/chroma-value format, and has not been subjected to color reproduction/sharpness processing.

10. An image processing method comprising:
performing a synthesis process of synthesizing multiple pieces of RAW image data, each of which constitutes an image of one frame, to generate synthesized RAW image data, wherein
the multiple pieces of RAW image data synthesized by the synthesis processing are multiple pieces of RAW image data that are temporally adjacent to each other, and have exposure periods that are made temporally mutually consecutive, and
the multiple pieces of RAW image data synthesized by the synthesis processing have exposure periods that are made temporally consecutive by performing an addition process of adding an exposure amount equivalent to non-exposure periods of an image-capturing element relative to an exposure amount in exposure periods of the image-capturing element.

11. A non-transitory computer readable medium storing a program, the program being executable by a processor to perform operations comprising:
performing a synthesis process of synthesizing multiple pieces of RAW image data, each of which constitutes an image of one frame, to generate synthesized RAW image data, wherein
the multiple pieces of RAW image data synthesized by the synthesis processing are multiple pieces of RAW image data that are temporally adjacent to each other, and have exposure periods that are made temporally mutually consecutive, and
the multiple pieces of RAW image data synthesized by the synthesis processing have exposure periods that are made temporally consecutive by performing an addition process of adding an exposure amount equivalent to non-exposure periods of an image-capturing element relative to an exposure amount in exposure periods of the image-capturing element.

12. The non-transitory computer readable medium according to claim 11, wherein the operations further comprise:
performing a development process on the synthesized RAW image data generated by the synthesis processing, to generate image data in a predetermined format.

13. The non-transitory computer readable medium according to claim 11, wherein the synthesis processing generates, by a synthesis process, synthesized RAW image data equivalent to an image captured at a shutter speed slower than a shutter speed at a time of image-capturing.

14. The non-transitory computer readable medium according to claim 11, wherein the multiple pieces of RAW image data synthesized by the synthesis processing are RAW image data of multiple temporally consecutive frames.

15. The non-transitory computer readable medium according to claim 11, wherein the multiple pieces of RAW image data synthesized by the synthesis processing are RAW image data of multiple temporally consecutive frames captured at a constant shutter speed.

16. The non-transitory computer readable medium according to claim 11, wherein the synthesis processing selects synthesis-subject RAW image data to be treated as a subject of a synthesis process from multiple pieces of temporally consecutive RAW image data, on a basis of specification of a shutter speed.

17. The non-transitory computer readable medium according to claim 11, wherein the synthesis processing selects synthesis-subject RAW image data to be treated as a subject of a synthesis process from multiple pieces of temporally consecutive RAW image data, on a basis of specification of the number of images.

\* \* \* \* \*